United States Patent
Wakabayashi

(10) Patent No.: US 7,173,573 B2
(45) Date of Patent: Feb. 6, 2007

(54) INSERTION-PORT LOOP ANTENNA AND NON-CONTACT TYPE COMMUNICATION MEDIUM PROCESSING UNIT

(75) Inventor: Naoyuki Wakabayashi, Osaka (JP)

(73) Assignee: Omron Corporation (JP)

( * ) Notice: Subject to any disclaimer, the term of this patent is extended or adjusted under 35 U.S.C. 154(b) by 0 days.

(21) Appl. No.: 10/943,881

(22) Filed: Sep. 20, 2004

(65) Prior Publication Data

US 2005/0062672 A1    Mar. 24, 2005

(30) Foreign Application Priority Data

Sep. 19, 2003    (JP)    ............... 2003/327400

(51) Int. Cl.
*H01Q 21/00* (2006.01)
*H01Q 7/00* (2006.01)
*H04B 1/38* (2006.01)

(52) U.S. Cl. .................. 343/867; 343/866; 455/557

(58) Field of Classification Search ........... 455/558, 455/557; 343/866, 867, 870, 742, 788, 895; 235/384, 382, 440
See application file for complete search history.

(56) References Cited

U.S. PATENT DOCUMENTS 5,382,781 A    1/1995   Inoue
5,602,556 A *  2/1997   Bowers ................. 343/742
6,422,475 B1   7/2002   May
6,525,694 B2 * 2/2003   Jiang et al. ........... 343/742
2003/0184493 A1 * 10/2003 Robinet et al. ........ 343/867

FOREIGN PATENT DOCUMENTS

| JP | 2002298117  | * 10/2002 |
| JP | 2003-099730 |   4/2003  |
| WO | WO 9746964  |  12/1997  |

* cited by examiner

*Primary Examiner*—Don Wong
*Assistant Examiner*—Angela M Lie
(74) *Attorney, Agent, or Firm*—Dickstein Shapiro LLP

(57) ABSTRACT

An insertion-port loop antenna has a wide communication region for a non-contact type IC card inserted into an insertion port of a card reader, etc. An insertion-port loop antenna is mounted in the vicinity of an insertion port, through which a non-contact type communication medium is inserted. The insertion-port loop antenna comprises two loops. An upper loop is arranged above a long side of the insertion port. A lower loop is arranged below the long side of the insertion port. The two loops are opposite to each other in a direction of winding. Thereby, magnetic flux is generated between the upper loop and the lower loop. The magnetic flux is generated in front of the insertion port. Therefore, it is possible to begin communication before the non-contact type IC card is inserted into the insertion port.

5 Claims, 15 Drawing Sheets

INSERTION-PORT LOOP ANTENNA AND NON-CONTACT TYPE COMMUNICATION MEDIUM PROCESSING UNIT

This patent specification is based on Japanese patent application No. 327400/2003 filed on Sep. 19, 2003, in the Japan Patent Office, the entire contents of which are incorporated by reference herein.

BACKGROUND OF THE INVENTION

1. Field of the Invention

The present invention relates to an antenna provided at an insertion port, through which a non-contact type communication medium is inserted. Further, the invention relates to a non-contact type communication medium processing unit provided with such antenna in order to read information stored in a non-contact type communication medium by means of non-contact type communication.

2. Description of the Related Art

JP-A-2001-118035 (FIGS. 1 and 3) describes an IC card reader that takes in a non-contact type IC card and communicates with the card to perform processing of card information. The IC card reader is provided at its insertion port with a communication coil for card detection in order to prevent a card, which is incapable of non-contact communication, from being taken into the IC card reader. A surface of the coil is arranged in parallel to a card surface of a non-contact type IC card. That is, a plane defined by a coil of a coil antenna in the non-contact type IC card and a plane defined by a coil of the communication coil for card detection are made parallel to each other. A shutter is provided between the insertion port and an interior of the IC card reader. When a non-contact type IC card is inserted into the insertion port, the communication coil for card detection detects presence of the non-contact type IC card. On the basis of such detection, the IC card reader opens the shutter. Without such detection, the IC card reader maintains the shutter in a closed state. Thereby, the IC card reader prevents taking-in of a card, which is incapable of non-contact communication. When the IC card reader opens the shutter, the IC card reader operates a card conveyance mechanism to take in a non-contact type IC card. The IC card reader is provided therein with a card-reader side communication coil. The card-reader side communication coil performs non-contact type communication with the taken in non-contact type IC card. Thereby, the IC card reader reads information of the non-contact type IC card.

JP-A-6-139416 (FIGS. 1 and 5) describes a data processing unit commonly usable for a contact type card such magnetic cards, contact type IC cards, etc. and a non-contact type IC card. The data processing unit is provided with a card insertion port. A contact type card is inserted into the insertion port. The data processing unit reads information of the contact type card therein. The data processing unit is provided in the vicinity of the insertion port with a single loop-shaped antenna. When a non-contact type IC card approaches the insertion port in a manner to make its card surface parallel to an antenna surface, the loop-shaped antenna reads information from the non-contact type IC card.

JP-UM-A-7-20662 (FIGS. 1 and 3) describes an automatic ticket checker for preventing the breakage of a mechanism for conveying a magnetic ticket and a non-contact type ticket when the non-contact type ticket is inserted into an insertion port, into which a magnetic ticket should be inserted. The automatic ticket checker is provided on an upper surface of its body with a first antenna for communication with a non-contact type ticket. On the basis of information of a non-contact type ticket obtained from the first antenna, the automatic ticket checker permits or inhibits entrance/exit of a user having a non-contact type ticket. The automatic ticket checker is provided at the insertion port with a shutter. The shutter is normally put in an opened state. When a contact-type ticket is inserted into the insertion port, the conveyance mechanism is operated to take in the contact-type ticket to read information thereof. On the basis of the read information, the automatic ticket checker permits or inhibits entrance/exit of a user having the contact type ticket. The automatic ticket checker is provided in the vicinity of the insertion port with a second antenna that communicates with a non-contact type ticket. When a non-contact type ticket approaches the insertion port, the second antenna detects approach of the non-contact type ticket. In order to prevent a non-contact type ticket from being erroneously inserted into the insertion port, the automatic ticket checker closes the shutter.

JP-A-2000-132646 (FIGS. 1 and 4) describes a card reader capable of reading information from a magnetic card, a contact type IC card, and a non-contact type IC card in a short time. When a non-contact type IC card is inserted into an insertion port of the card reader, the card reader reads information of the non-contact type IC card by means of an antenna provided at the insertion port. Thereby, a period of time for conveying the non-contact type IC card is shortened. When a contact type IC card is inserted into the insertion port of the card reader, the card reader has an IC contact unit, which is provided at the insertion port, contacting with the contact type IC card. Then, the card reader reads information from the contact type IC card. Thereby, a period of time for conveying the contact type IC card is shortened. When the card reader judges that a card is neither a non-contact type IC card nor a contact type IC card, the card reader conveys the card inside thereof. Then, a magnetic head is used to read information.

JP-A-2000-172794 (FIG. 1) describes a non-contact card system that reads information of a non-contact type IC card. Two coil antennas are provided on U-shaped, opposed inside walls in a frame that is U-shaped in cross section. A first coil antenna surface and a second coil antenna surface are opposed to each other. When a non-contact type IC card enters a space defined by the two coil antenna surfaces, the non-contact card system communicates with the non-contact type IC card.

JP-A-2003-99730 (FIG. 1); JP-A-8-330838 (FIGS. 1 and 3); JP-A-11-316805 (FIG. 2); JP-A-7-30319 (FIG. 3) describe loop antennas for enhancement of communication performance. The loop antennas comprise two continuous coil antennas. A first coil antenna is wound clockwise. A second coil antenna is wound counterclockwise.

BRIEF SUMMARY OF THE INVENTION

It is an object of the invention to provide an insertion-port loop antenna having a wide communication region for a non-contact type IC card inserted into an insertion port of a card reader, etc.

An insertion-port loop antenna mounted in the vicinity of a rectangular-shaped insertion port, through which a non-contact type communication medium is inserted, comprises two loops, one of which is arranged above a long side of the insertion port and the other of which is arranged below the long side of the insertion port, the two loops being opposite to each other in a winding direction.

When an alternating current flows to the insertion-port loop antenna, magnetic flux is generated in the air between the upper and lower loops. That is, magnetic flux is generated in a position on the outside of the insertion port. Also, the position on the outside may mean a position on this side of an antenna surface. Magnetic flux is reversed in direction according to cycles of the alternating current. When a non-contact type communication medium comes to a position, which is on the outside of the insertion port and in which magnetic flux flows, communication begins between the non-contact type communication medium and the antenna.

A non-contact type communication medium is assumed to be rectangular in shape and formed with an antenna substantially in parallel to that surface thereof, which is maximum in area. Since a user is going to insert a rectangular-shaped non-contact type communication medium into a rectangular-shaped insertion port, an antenna surface of the non-contact type communication medium and magnetic flux intersect each other substantially perpendicularly. Thereby, communication is made while the non-contact type communication medium is placed in a position on the outside of a position, in which it intersects the antenna surface.

By winding a conductive line in a loop-like manner, a loop antenna is formed. When the conductive line is increased in the number of turns, magnetic flux generated around the conductive line when an electric current of the same magnitude is passed through the conductive line is increased in quantity.

The insertion port, through which a non-contact type communication medium is inserted, is rectangular in shape. It is preferable that when a non-contact type communication medium is inserted into the insertion port, the long side of the insertion port and an antenna surface of the non-contact type communication medium be in parallel to each other. The non-contact type communication medium has a configuration such as rectangular-shaped card, disk, etc. Preferably, a planar antenna is formed on a plane portion of the non-contact type communication medium.

Also, a plane defined by the respective loops of the insertion-port loop antenna can be made substantially perpendicular to a direction, in which the non-contact type communication medium is inserted. The wording "substantially perpendicular" means that a perpendicular arrangement is most preferable. And, that range, in which inclination from the vertical is permissible, is one, in which a communication region is formed in front of the insertion port.

Also, a single magnetic body can be provided in a position that is at the back of the loop in a direction, in which the non-contact type communication medium is inserted, and overlaps the two loops but does not overlap the insertion port. The ferromagnetic body is preferably made of iron, ferrite, etc.

Thereby, little magnetic flux is present in a position, which is at the back of the insertion port and into which a non-contact type communication medium is inserted. Magnetic flux generated in a position on the outside or front side of the insertion port and magnetic flux generated in a position at the back of the insertion port will not cancel each other in an antenna of a non-contact type communication medium. When a non-contact type communication medium is inserted into the insertion port, magnetic flux intersects an antenna surface of a non-contact type communication medium in a position on the front side of the insertion port. Magnetic flux does not intersect the antenna surface of the non-contact type communication medium in a position at the back of the insertion port.

A non-contact type communication medium insertion-port module comprises a rectangular-shaped insertion port, through which a non-contact type communication medium is inserted, an insertion-port loop antenna mounted in the vicinity of the rectangular-shaped insertion port to comprise two loops, one of which is arranged above a long side of the insertion port and the other of which is arranged below the long side of the insertion port, the two loops being opposite to each other in a winding direction, and a metallic plate formed with the insertion port and a single hole, in which the two loops of the insertion-port loop antenna is mounted.

When an electric current flows through a loop antenna in order to perform communication, an eddy current is generated in a conductive line around loops of the loop antenna. Since the upper and lower loops are disposed in the single hole provided in the metallic plate as described above, however, eddy currents being generated from the respective loops cancel each other, so that little eddy current is generated around the single hole. Thereby, eddy current loss is reduced due to the presence of the metallic plate.

A non-contact type communication medium processing unit comprises a rectangular-shaped insertion port, through which a non-contact type communication medium is inserted, a conveyance mechanism that conveys a non-contact type communication medium inserted from the insertion port, a shutter positioned between the insertion port and the conveyance mechanism, an antenna that communicates with the non-contact type communication medium conveyed by the conveyance mechanism, an insertion-port loop antenna mounted in the vicinity of the rectangular-shaped insertion port to comprise two loops, one of which is arranged above a long side of the insertion port and the other of which is arranged below the long side of the insertion port, the two loops being opposite to each other in a winding direction, and a shutter control unit that opens the shutter on the basis of the insertion-port loop antenna having been able to communicate with the non-contact type communication medium.

Thereby, when a non-contact type communication medium is present in front of the insertion port of the non-contact type communication medium processing unit, the non-contact type communication medium processing unit opens the shutter. Since the insertion-port loop antenna has a communication range that covers a front of the insertion port, it is possible to begin communication to detect a non-contact type communication medium while the non-contact type communication medium is present in front of the insertion port.

An insertion-port loop antenna mounted in the vicinity of a rectangular-shaped insertion port, through which a non-contact type communication medium is inserted, comprises two loops, one of which is arranged above a long side of the insertion port and the other of which is arranged below the long side of the insertion port. A ferromagnetic body can cover a circumference of one of loop bundles of an upper loop in parallel to the long side of the insertion port and a ferromagnetic body can cover a circumference of one of loop bundles of a lower loop in parallel to the long side of the insertion port.

Thereby, since adjacent loop bundles in a single loop have no influence on each other, it is possible to reduce an area of a loop plane.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

Figure 1:
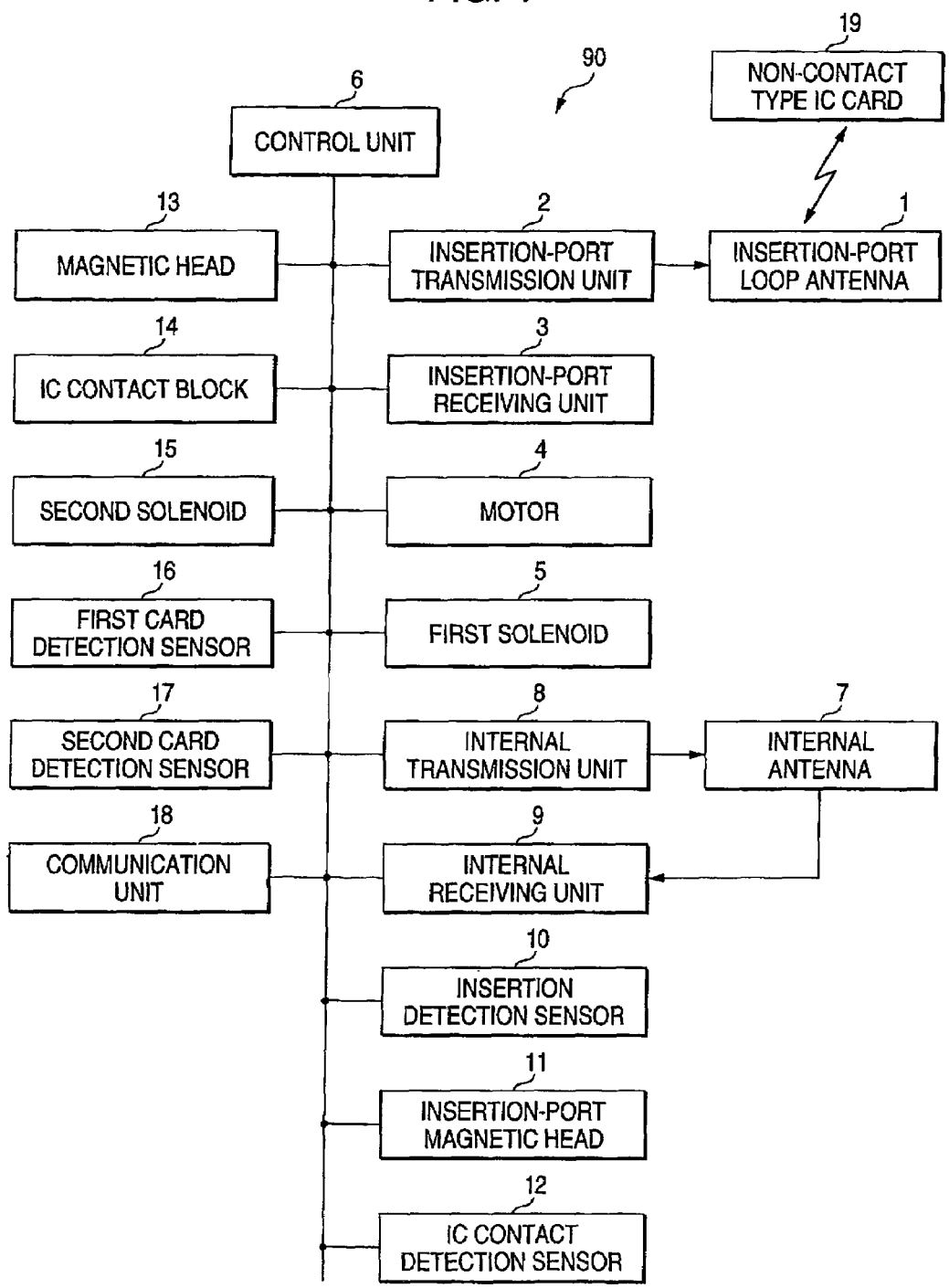
FIG. 1 is a block diagram illustrating an electric construction of an exemplary card processing unit of the invention.

An exemplary embodiment of the invention will be described with reference to the drawings. In the drawings, similar parts are denoted by the same reference numerals.

A card processing unit described herein performs processing of a magnetic card, a contact type IC card, and a non-contact type IC card. A magnetic card has magnetic stripes on its surface. Magnetic information is recorded on magnetic stripes. A contact type IC card comprises an IC chip provided with a memory. The contact type IC card comprises on its surface an IC contact connected to an IC chip. The contact type IC card performs communication through the IC contact. A non-contact type IC card comprises an IC chip provided with a memory. Connected to the IC chip is a coil antenna that performs non-contact type communication. A card processing unit takes in a card to perform reading and writing of information on the card. A conveyance passage, through which a card is taken in, is common to respective cards. Thereby, processing is performed even on different kinds of cards when a user inserts a card into an insertion port of a card processing unit.

A card processing unit is connected to a high-order apparatus such as automatic cash transaction apparatuses, etc. A card processing unit receives a command from an automatic cash transaction apparatus to be operated. Also, a card processing unit transmits information read from a card to an automatic cash transaction apparatus.

FIG. 1 is a block diagram illustrating an electric construction of a card processing unit 90. A control unit 6 controls other constituent parts of the card processing unit 90. Also, the control unit 6 receives information from the constituent parts. For example, the control unit 6 receives detection signals from sensors. The control unit 6 stores the received detection signals in an internal memory thereof. The control unit 6 drives an actuator such as a motor 4. The control unit 6 outputs information read from a non-contact type IC card 19 to an external high-order apparatus via a communication unit 18 Also, the control unit 6 receives information from external apparatuses through the communication unit 18. On the basis of the received information, the control unit 6 controls an internal transmission unit 8 in a manner to write information on a non-contact type IC card.

When information is transmitted to an insertion-port transmission unit 2 from the control unit 6, the insertion-port transmission unit 2 converts the information into codes to modulate the same. Then, the insertion-port transmission unit 2 transmits the modulated signals from an insertion-port loop antenna 1. Then, the information is transmitted to the non-contact type IC card 19. When a reply is received from the non-contact type IC card 19, a signal is transmitted to an insertion-port receiving unit 3 from the insertion-port loop antenna 1. The insertion-port receiving unit 3 demodulates and decodes the transmitted signal. Then, the insertion-port receiving unit 3 transmits the decoded information to the control unit 6.

On the basis of whether the insertion-port loop antenna 1 has communicated with the non-contact type IC card 19, the control unit 6 determines the opening and closing of a shutter provided in the vicinity of the insertion port.

The motor 4 rotates rollers that constitute a conveyance passage inside the card processing unit 90. In accordance with a command from the control unit 6, the motor 4 rotates the rollers forward or rearward. Thereby, a card present on the conveyance passage is conveyed.

In accordance with a command from the control unit 6, a first solenoid 5 opens and closes the shutter provided on the conveyance passage. The shutter is provided in the vicinity of the insertion port of the card processing unit 90.

When the shutter is opened and a non-contact type IC card is conveyed into the card processing unit, non-contact type communication is made between the non-contact type IC card 19 and an internal antenna 7. When information is transmitted to the internal transmission unit 8 from the control unit 6, the internal transmission unit 8 converts the information into codes to modulate the same. Then, the internal transmission unit 8 transmits the modulated signal from the internal antenna 7 and information is transmitted to the non-contact type IC card 19. When a reply is returned from the non-contact type IC card 19, a signal is transmitted to an internal receiving unit 9 from the internal antenna 7. The internal receiving unit 9 demodulates and decodes the transmitted signal. Then, the internal receiving unit 9 transmits the decoded information to the control unit 6.

An insertion detection sensor 10 detects whether a card-shaped body has been inserted into the insertion port. On the basis of the detection results, the control unit 6 determines the opening and closing of the shutter.

An insertion-port magnetic head 11 is provided at the insertion port of the card processing unit 90. The insertion-port magnetic head 11 reads magnetic information of a magnetic card inserted into the insertion port. On the basis of presence and absence of magnetic information, the insertion-port magnetic head 11 detects whether a magnetic card has been inserted into the insertion port. On the basis of the detection results, the control unit 6 determines the opening and closing of the shutter.

An IC contact detection sensor 12 detects an IC contact of a contact type IC card inserted into the insertion port. On the basis of the detection results, the control unit 6 determines opening and closing of the shutter. An IC contact of a contact type IC card is in many cases made of a non-magnetic substance such as copper, gold, etc. Hereupon, a non-magnetic substance detection sensor that detects such materials can be used as the IC contact detection sensor 12.

A magnetic head 13 reads magnetic information of a magnetic card conveyed into the card processing unit 90. The magnetic head 13 transmits the read magnetic information to the control unit 6. Also, the rollers rotate to convey the magnetic card again and the magnetic head 13 can also write magnetic information.

An IC contact block 14 reads information stored in a contact type IC card 19 having been conveyed into the card processing unit 90. The IC contact block 14 transmits the read magnetic information to the control unit 6. When information being written is transmitted from the control unit 6, the IC contact block 14 writes information on the contact type IC card.

When a contact type IC card is conveyed into the card processing unit 90, a second solenoid 15 lowers the IC contact block 14. Thereby, the IC contact block 14 and an IC contact of the contact type IC card contact with each other. After contact, communication is made between the IC contact block 14 and the contact type IC card. Communication affords reading and writing of information. When communication is terminated, energization of the second solenoid 15 is stopped. Then, the IC contact block 14 ascends. Then, the rollers rotate to discharge the contact type IC card from the card processing unit 90.

A first card detection sensor 16 and a second card detection sensor 17 detect whether a card conveyed is present in a predetermined position on the conveyance passage of the card processing unit.

The communication unit 18 transmits and receives information from a high-order apparatus. The communication unit 18 transmits information read from a card. The communication unit 18 receives information being written from the high-order apparatus.

The insertion-port loop antenna 1 is described with reference to FIG. 2. The insertion-port loop antenna 1 is mounted in the vicinity of the insertion port 23. The insertion-port loop antenna 1 comprises an upper loop 20 and a lower loop 21. A length of conductive line 22 is used for the insertion-port loop antenna 1. The upper loop 20 and the lower loop 21 are formed by winding the conductive line 22 in a loop. When the conductive line 22 is increased in the number of turns, magnetic flux generated around the upper loop 20 and the lower loop 21 when an electric current is passed through the conductive line 22 is increased in number. An alternating current flows to the insertion-port loop antenna 1 from antenna terminals 24. Arrows shown in the vicinity of the antenna terminals 24 indicate directions of an electric current at a certain moment. Directions of an electric current are changed according to cycles of an alternating current. The antenna terminals 24 are connected to the insertion-port transmission unit 2 and the insertion-port receiving unit.

The insertion port 23 is rectangular-shaped. A card such as a non-contact type IC card 19, etc. is inserted into the insertion port 23. The insertion-port loop antenna 1 is provided in the vicinity of the insertion port 23. The upper loop 20 is provided above a long side of the insertion port 23. The lower loop 21 is provided below the long side of the insertion port 23.

When an electric current flows in directions of arrows shown in the vicinity of the antenna terminals 24, an electric current flows through the upper loop 20 in a direction of an arrow shown in the loop 20. An electric current flows through the lower loop 21 in a direction of an arrow shown in the loop 21. Thereby, magnetic flux is generated in a region on a front side of a plane of FIG. 2 to be directed toward the lower loop 21 from the upper loop 20. That is, magnetic flux flows in the air. Thereby, magnetic flux flows in a position on the outside or front side of the insertion port 23. Accordingly, a region, in which magnetic flux is generated in a position outside the insertion port 23, constitutes a communication region. In the communication region, the card processing unit 90 and a non-contact type IC card 19 can communicate with each other. Thereby, before a non-contact type IC card 19 is inserted into the insertion port, the card processing unit 90 can detect presence and absence of a non-contact type IC card 19. Also, magnetic flux flows toward the upper loop 20 from the lower loop 21 in a region on a back side of a plane of FIG. 2. A communication region is defined in the region on the back side of the plane.

Figure 3:
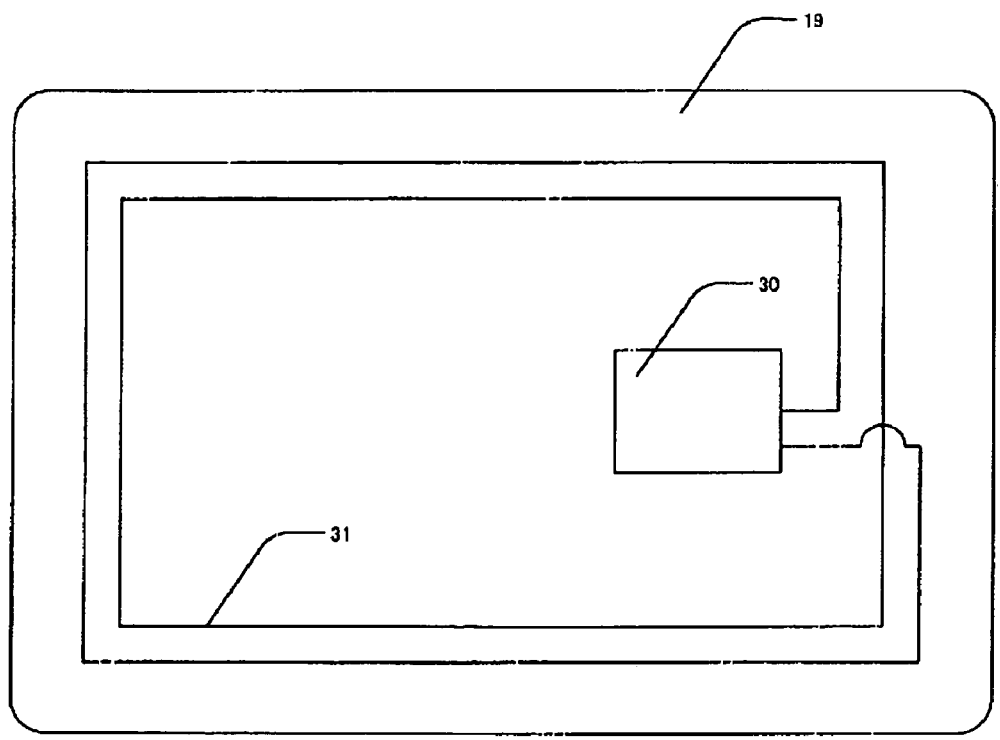
FIG. 3 is a view showing positions of a loop antenna for a non-contact type IC card and an IC chip.

An outline of a circuit of a non-contact type IC card 19 is described with reference to FIG. 3. A loop antenna 31 for a non-contact type IC card is provided in parallel to a largest surface of a non-contact type IC card 19. An IC chip 30 is connected to terminals of the loop antenna 31 for a non-contact type IC card. When a non-contact type IC card 19 is inserted into the insertion port 23, a loop surface of the loop antenna 31 for a non-contact type IC card and a loop surface of the insertion-port loop antenna 1 intersect each other perpendicularly. Thereby, magnetic flux generated from the insertion-port loop antenna 1 perpendicularly intersects the loop surface of the loop antenna 31 for a non-contact type IC card. Thereby, the insertion-port loop antenna 1 and the loop antenna 31 for a non-contact type IC card communicate with each other.

Figure 4:
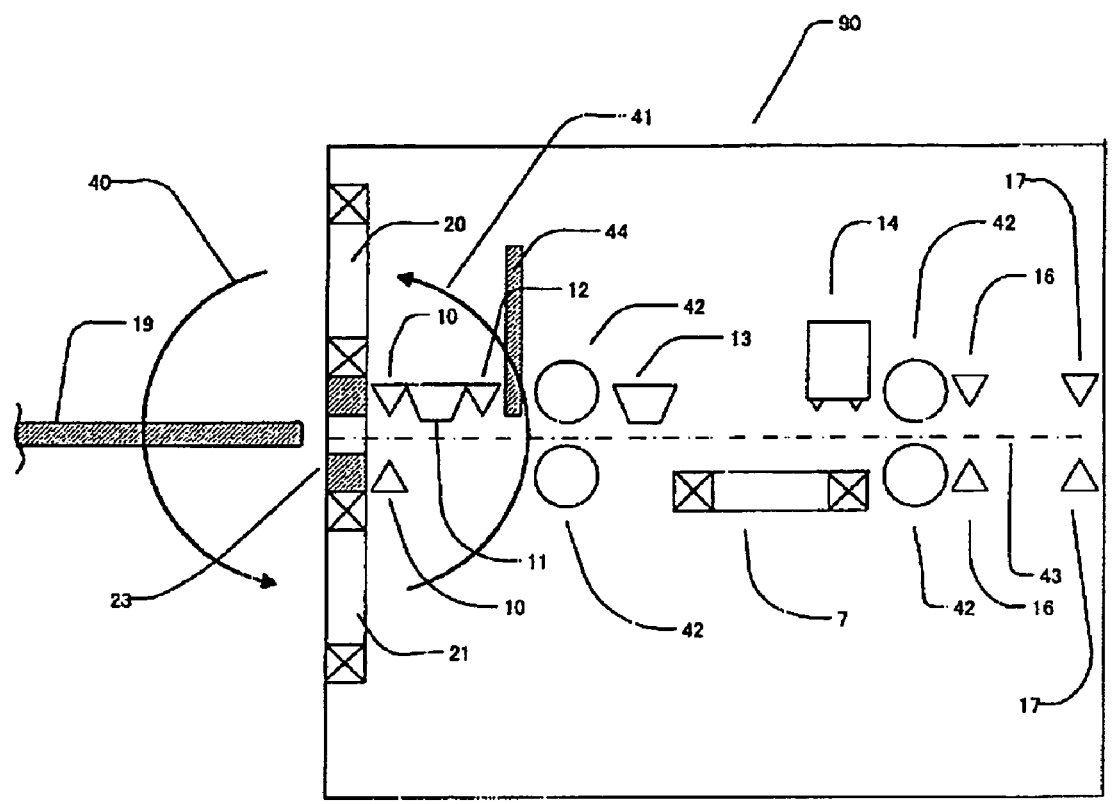
FIG. 4 shows a cross section as viewed from a side of the card processing unit.

FIG. 4 is a cross sectional view as viewed from a side of the card processing unit 90. This is a cross sectional view taken along an alternate long and short dash line indicated by arrows A in FIG. 2. The view shows a state, in which a user is going to insert a non-contact type IC card 19 into the insertion port 23. The upper loop 20 is provided above the insertion port 23. The lower loop 21 is provided below the insertion port 23. When an electric current flows in the directions of the arrows shown in FIG. 2, magnetic flux 40 is generated outside the insertion-port loop antenna 1. The external magnetic flux 40 flows toward the lower loop 21 from the upper loop 20 in a direction of an arrow for the external magnetic flux 40. Therefore, the external magnetic flux 40 is generated in front of the insertion port 23. Thereby, the card processing unit 90 can communicate with a non-contact type IC card 19 in a region in front of the insertion port 23. Accordingly, the card processing unit 90 detects presence and absence of a non-contact type IC card 19.

Internal magnetic flux 41 is generated at the back of the insertion port 23. An alternating current flows through the insertion-port loop antenna 1. Whenever an electric current flowing through the insertion-port loop antenna 1 is changed in direction, the external magnetic flux 40 and the internal magnetic flux 41 are reversed in direction. Magnetic flux generated from the insertion-port loop antenna 1 perpendicularly intersects a card surface in a position, in which a non-contact type IC card 19 is to be inserted. Thereby, the insertion-port loop antenna 1 and a non-contact type IC card communicate with each other. While many magnetic fluxes flow between the upper loop 20 and the lower loop 21, only the external magnetic flux 40 and the internal magnetic flux 41 are shown for clarity purposes.

The insertion detection sensor 10 detects whether a card-shaped body has been inserted. The insertion detection sensor 10 can be mounted at an end of the insertion port 23. A micro switch can be used as the insertion detection sensor 10. When a card is inserted into the insertion port 23, an end of the card pushes the micro switch so it is possible to detect presence of the card. Also, a photosensor can be used as the insertion detection sensor 10. When light is projected to a light receiving part from a light projecting part and intercepted, it is possible to detect insertion of a card-shaped body. FIG. 4 shows an example of a photosensor as the insertion detection sensor 10.

The insertion-port magnetic head 11 detects the presence and absence of magnetic information on a card inserted into the insertion port 23.

The IC contact detection sensor 12 detects the presence and absence of an IC contact of a contact type IC card inserted into the insertion port 23.

In the case where the insertion detection sensor 10 detects a card and can make communication through the insertion-port loop antenna 1, it is meant thereby that a non-contact type IC card 19 has been inserted into the insertion port 23. Therefore, the card processing unit 90 energizes the first solenoid 5 to open the shutter 44.

The shutter 44 is closed in an initial state. In a state, in which the shutter 44 is closed, the shutter 44 crosses a conveyance passage 43. Thereby, foreign matter is prevented from being inserted into the card processing unit 90.

Now, an explanation is given to describe non-contact type communication. A card processing unit transmits to an unspecified non-contact type IC card a poling signal from its antenna. The card processing unit is not notified of when a non-contact type IC card approaches the antenna. Therefore, the card processing unit transmits a poling signal every predetermined time interval. The time interval is decided on the basis of transmission speed and processing time of a non-contact type IC card. Therefore, at maximum a time twice the predetermined time interval is necessary for completion of the communication when a non-contact type IC card enters the communication region. Because of this, it takes time until a card processing unit receives a response from a non-contact type IC card.

The card processing unit 90 according to the invention can communicate with a non-contact type IC card 19 in a position on the front side or outside of the insertion port 23. Therefore, at a point of time when a non-contact type IC card 19 is inserted into the insertion port 23, communication is completed and presence of the non-contact type IC card 19 can be detected in most cases. Therefore, when the insertion detection sensor 10 detects a card, the card processing unit 90 can open the shutter 44 immediately. Since communication is begun in a position on the front side of the insertion port, there is time left before the non-contact type IC card 19 reaches a position corresponding to the shutter 44 since the card processing unit 90 and the non-contact type IC card 19 have completed communication therebetween. A leading end of the non-contact type IC card 19 least strikes against the shutter 44 before communication has not been completed since a user inserts the card.

In the case where the insertion detection sensor 10 detects a card and the insertion-port magnetic head 11 detects magnetic information, it is meant thereby that a magnetic card has been inserted into the insertion port 23. Accordingly, the card processing unit 90 energizes the first solenoid 5 to open the shutter 44.

In the case where the insertion detection sensor 10 detects a card and the IC contact detection sensor 12 detects an IC contact, it is meant thereby that a contact type IC card has been inserted into the insertion port 23. Therefore, the card processing unit 90 energizes the first solenoid 5 to open the shutter 44.

When the shutter 44 is opened, the card processing unit 90 drives the motor 4 to rotate the rollers 42 forward. A user of a card inserts a card into the insertion port 23. And, when the user inserts a leading end of the card to a position corresponding to the rollers 42, the card processing unit 90 conveys the card by virtue of rotation of the rollers 42.

In the case where the inserted card is a non-contact type IC card, the rollers 42 convey the non-contact type IC card 19 on the conveyance passage 43. When a first card detection sensor 16 detects the non-contact type IC card, the card processing unit 90 stops rotation of the rollers 42. In order to perform reading and writing of information on the non-contact type IC card, the card processing unit 90 energizes an internal antenna 7. Thereby, magnetic flux is generated from the internal antenna 7 and communication with the non-contact type IC card is performed. Therefore, the card processing unit 90 performs reading and writing of information on the non-contact type IC card. When communication has been terminated, the card processing unit 90 rotates the rollers 42 rearward to discharge the non-contact type IC card from the insertion port 23. When the non-contact type IC card is discharged outside the insertion port 23 and a predetermined period of time has elapsed, the card processing unit 90 closes the shutter 44.

In the case where the inserted card is a magnetic card, the rollers 42 are rotated to convey the magnetic card on the conveyance passage 43 at a constant speed. In the course of conveyance, magnetic stripes of the magnetic card and the magnetic head 13 are brought into contact with each other. Accordingly, the magnetic head 13 reads magnetic information recorded on the magnetic stripes. When the second card detection sensor 17 detects the magnetic card, rotation of the rollers 42 is stopped. In the case where magnetic information is to be written on the magnetic card, magnetic information can be written on the magnetic stripes of the magnetic card by conveying the magnetic card and passing an electric current through the magnetic head 13 on the basis of information being written. When the reading or writing of magnetic information on the magnetic card is terminated, the card processing unit 90 rotates the rollers rearward. Thereby, the magnetic card is discharged outside the insertion port 23. When the magnetic card is discharged outside the insertion port 23 and a predetermined period of time has elapsed, the card processing unit 90 closes the shutter 44.

In the case where the inserted card is a contact type IC card, the rollers 42 are rotated to convey the contact type card on the conveyance passage 43. When the first card detection sensor 16 detects the contact type IC card, the card processing unit 90 stops rotation of the rollers 42. In order to perform reading and writing of information on the contact type IC card, the card processing unit 90 energizes the second solenoid. Thereby, the IC contact block 14 descends. Then, a contact of the IC contact block 14 and an IC contact of the contact type IC card are brought into contact with each other. According to communication made between the IC contact block 14 and the contact type IC card, the card processing unit 90 performs reading and writing of information on the contact type IC card. When communication is terminated, energization of the second solenoid 15 is stopped. Thereby, the IC contact block 14 separates from the contact type IC card. The card processing unit 90 rotates the rollers 42 rearward to discharge the contact type IC card from the insertion port 23. When the contact type IC card is discharged outside the insertion port 23 and a predetermined period of time has elapsed, the card processing unit 90 closes the shutter 44.

The first card detection sensor 16 and the second card detection sensor 17 can be composed of a photosensor. The photosensor comprises a light projecting part above the conveyance passage 43 and a light receiving part below the conveyance passage. When any card is not present between the light projecting part and the light receiving part, light projected from the light projecting part is received by the light receiving part. When a card is present between the light projecting part and the light receiving part, light projected from the light projecting part is intercepted by the card. It is possible on the basis of presence or absence of received light to detect whether a card is present between the light projecting part and the light receiving part.

Figure 5:
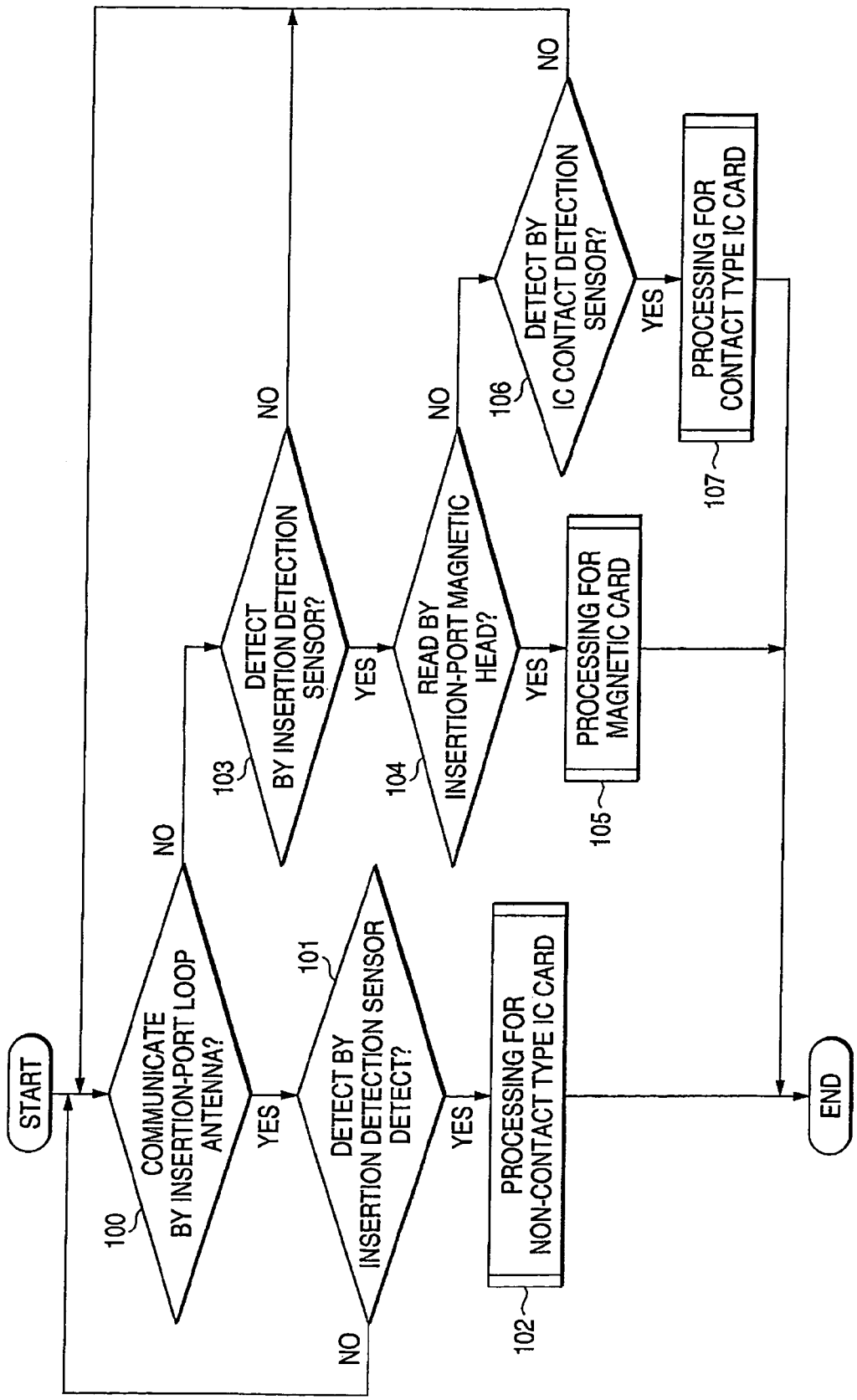
FIG. 5 is a flowchart illustrating exemplary processing in the card processing unit.

FIG. 5 illustrates exemplary processing for the card processing unit 90. In STEP 100, the card processing unit 90 detects whether the insertion-port loop antenna 1 has been able to communicate with a non-contact type IC card 19. When it is detected that communication has been enabled, the procedure proceeds to STEP 101. When it is detected that communication has not been enabled, the procedure proceeds to STEP 103.

In STEP 101, the insertion detection sensor 10 detects whether a card has been inserted into the insertion port 23. In the case where a card is detected, a non-contact type IC card 19 has been inserted into the insertion port 23, and then the procedure proceeds to STEP 102, in which the processing for the non-contact type IC card 19 is performed. The processing in STEP 102 is described later in detail. In the case where a card is not detected in STEP 101, a non-contact type IC card 19 is present in the vicinity of the insertion port but has not been inserted into the insertion port 23. Hereupon, the procedure returns to STEP 100.

In STEP 103, the insertion detection sensor 10 detects whether a card has been inserted into the insertion port 23. When a card is detected, the procedure proceeds to STEP 104. When a card is not detected, the procedure returns to STEP 100.

In STEP 104, when the insertion-port magnetic head 11 detects magnetic information recorded on magnetic stripes, a magnetic card has been inserted into the insertion port 23. Then, the procedure proceeds to STEP 105, in which the processing for a magnetic card is performed. Details of STEP 105 are described later. When a magnetic stripe is not detected in STEP 104, the procedure proceeds to STEP 106.

In STEP 106, when the IC contact detection sensor 12 detects an IC contact, a contact type IC card has been inserted into the insertion port 23. Then, the procedure proceeds to STEP 107, in which the processing for a contact type IC card is performed. Details of STEP 107 are described later. When any IC contact is not detected in STEP 106, the procedure returns to STEP 100.

Figure 6:
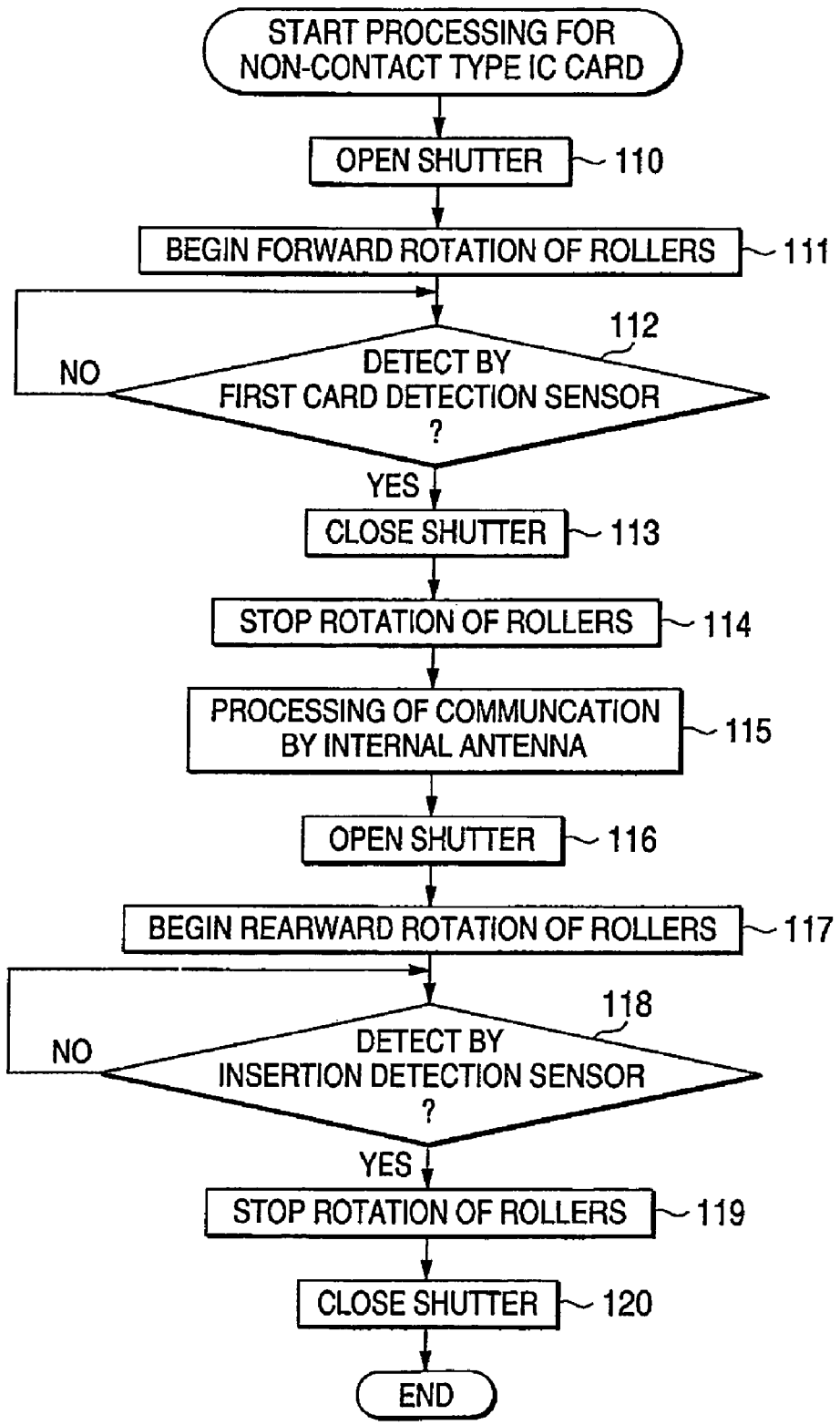
FIG. 6 is a flowchart illustrating exemplary processing for a non-contact type IC card.

STEP 102, in which the processing for a non-contact type IC card 19 is performed, is described in detail with reference to FIG. 6. Since a non-contact type IC card 19 has been inserted into the insertion port 23, the card processing unit 90 energizes the first solenoid 5 in STEP 110. Thereby, the shutter 44 is opened. In STEP 111, the card processing unit 90 drives the motor 4. Thereby, the rollers 42 are rotated forward. Then, rotation of the rollers 42 causes the non-contact type IC card 19 to be conveyed inside the card processing unit 90.

When the first card detection sensor 16 detects the non-contact type IC card 19 in STEP 112, the procedure proceeds to STEP 113. The rollers 42 continue to rotate until the first card detection sensor 16 detects the non-contact type IC card 19 in STEP 112.

Since detection of a card by the first card detection sensor 16 means conveyance of the card to a predetermined position, energization of the first solenoid 5 is stopped in STEP 113 and the shutter 44 is closed. By closing the shutter 44, it becomes possible to prevent foreign matter from being inserted into the insertion port 23 during the processing of a card.

Also, since detection of a card by the first card detection sensor 16 means conveyance of the card to a predetermined position, driving of the motor 4 is stopped in STEP 114. Thereby, rotation of the rollers 42 is stopped. In keeping with this, the non-contact IC card 19 is stopped in a position suited to communication with the internal antenna 7.

In STEP 115, communication is performed between the internal antenna 7 and the non-contact IC card 19. Having read information from the non-contact type IC card 19 through the internal antenna 7, the card processing unit 90 transmits the information to a high-order apparatus via the communication unit 18. Also, the card processing unit 90 receives information from the high-order apparatus via the communication unit 18. On the basis of the received information, the card processing unit 90 writes information on the non-contact type IC card 19 via the internal antenna 7. When communication is terminated, the procedure returns to STEP 116.

In order to return the non-contact IC card 19 from the insertion port 23, the card processing unit 90 energizes the first solenoid 5 to open the shutter 44 in STEP 116.

In STEP 117, driving of the motor 4 begins. Thereby, the rollers 42 are rotated rearward. Then, the non-contact type IC card 19 is conveyed toward the insertion port 23.

When the insertion detection sensor 10 detects the non-contact type IC card 19 in STEP 118, driving of the motor 4 is stopped after the lapse of a predetermined period of time in STEP 119. Thereby, rotation of the rollers 42 is stopped. At this time, the non-contact type IC card 19 has been discharged from the insertion port 23. A user takes out the non-contact type IC card 19 from the insertion port 23.

The rollers 42 are rotated rearward and conveyance of the non-contact type IC card is continued until the non-contact type IC card 19 is detected in STEP 118.

When the predetermined period of time has elapsed after driving of the motor 4 is stopped in STEP 119, it is presumed that a user has taken out the non-contact type IC card 19 and energization of the first solenoid 5 is stopped in STEP 120. Thereby, the shutter 44 is closed. Also, instead of detecting whether the predetermined period of time has elapsed, a determination can be made to determine whether the insertion detection sensor 10 has detected the card. At this time, in the case where the insertion detection sensor 10 has not detected the card, energization of the first solenoid 5 is stopped and the shutter 44 is closed.

Figure 7:
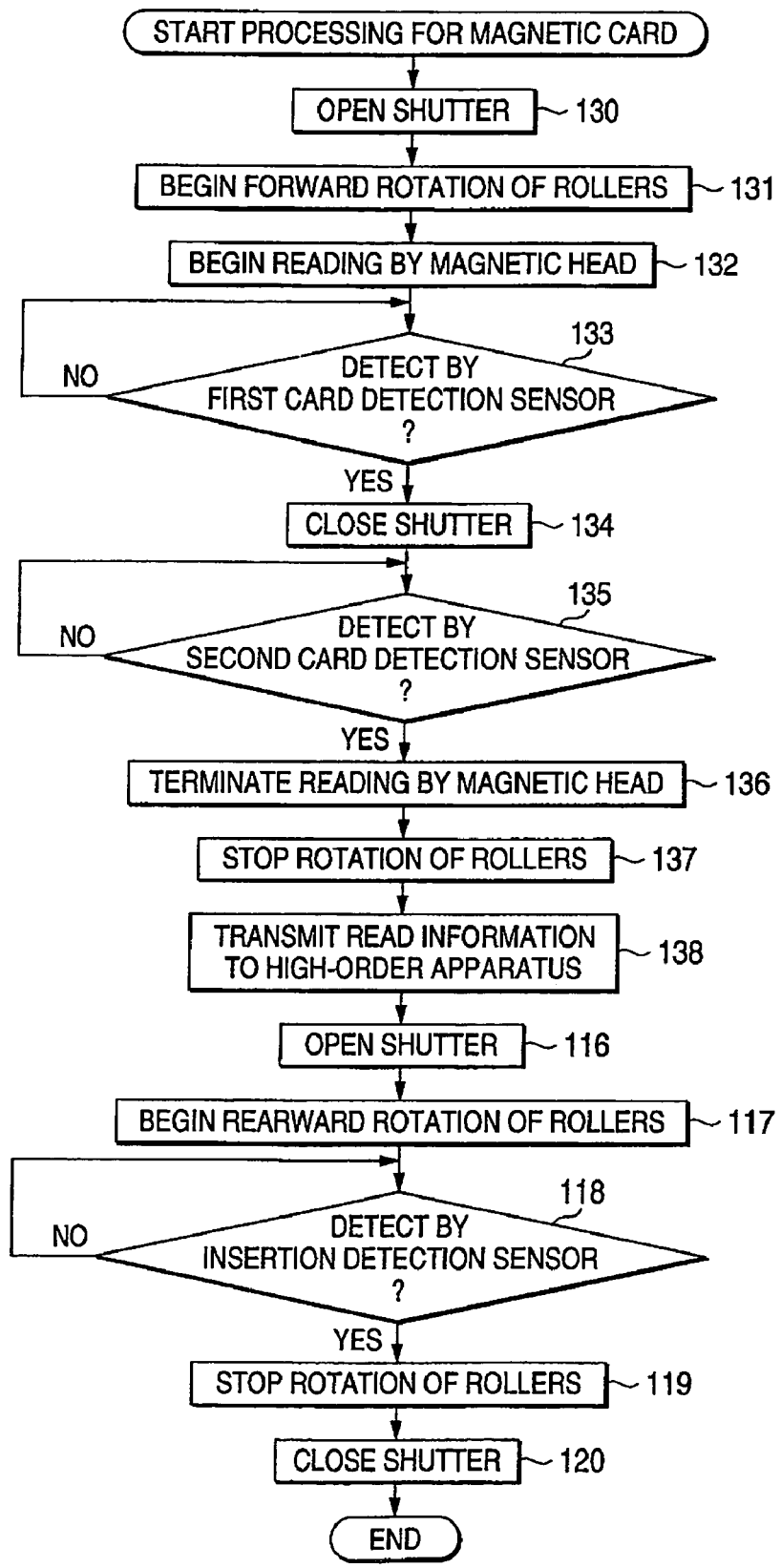
FIG. 7 is a flowchart illustrating exemplary processing for a magnetic card.

With reference to FIG. 7, an explanation is given regarding the processing for a magnetic card in STEP 105 (illustrated in FIG. 5). Since a magnetic card is inserted into the insertion port 23, the card processing unit 90 energizes the first solenoid 5 in STEP 130. Thereby, the shutter 44 is opened. In STEP 131, the card processing unit 90 drives the motor 4. Thereby, the rollers 42 are rotated forward. Then, the rollers 42 are rotated to convey the magnetic card inside the card processing unit 90 at a constant speed.

In STEP 132, the magnetic head 13 comes into contact with magnetic stripes of the magnetic card in the course of conveyance. Thereby, the magnetic head 13 reads magnetic information. At this time, rotation of the rollers 42 continues.

When the first card detection sensor 16 detects the magnetic card in STEP 133, the procedure proceeds to STEP 134. In STEP 134, the shutter 44 is closed. Thereby, insertion of a foreign matter from the insertion port 23 is prevented while the magnetic card is subjected to processing. At this time, rotation of the rollers 42 continues and the magnetic head 13 continues to read magnetic information.

When the second card detection sensor 17 detects the magnetic card in STEP 135, the procedure proceeds to STEP 136. At this time, since all regions of the magnetic stripes of the magnetic card have passed the magnetic head 13, reading by the magnetic head 13 is stopped in STEP 136. Until the second card detection sensor 17 detects the magnetic card in STEP 135, reading by the magnetic head 13 is continued.

In STEP 137, driving of the motor 4 is stopped. Thereby, rotation of the rollers 42 is stopped.

In STEP 138, information read by the magnetic head 13 is transmitted to a high-order apparatus via the communication unit 18. The card processing unit 90 may write information on a magnetic card. Details of the writing processing are omitted.

In order to return the magnetic card from the insertion port 23, the card processing unit 90 opens the shutter 44 in STEP 116. Since the respective STEPs subsequent to STEP 116 are the same as those in the processing for a non-contact type IC card 19, they are omitted. The respective STEPs are denoted by the same numbers as those of the STEPs shown in FIG. 6.

Figure 8:
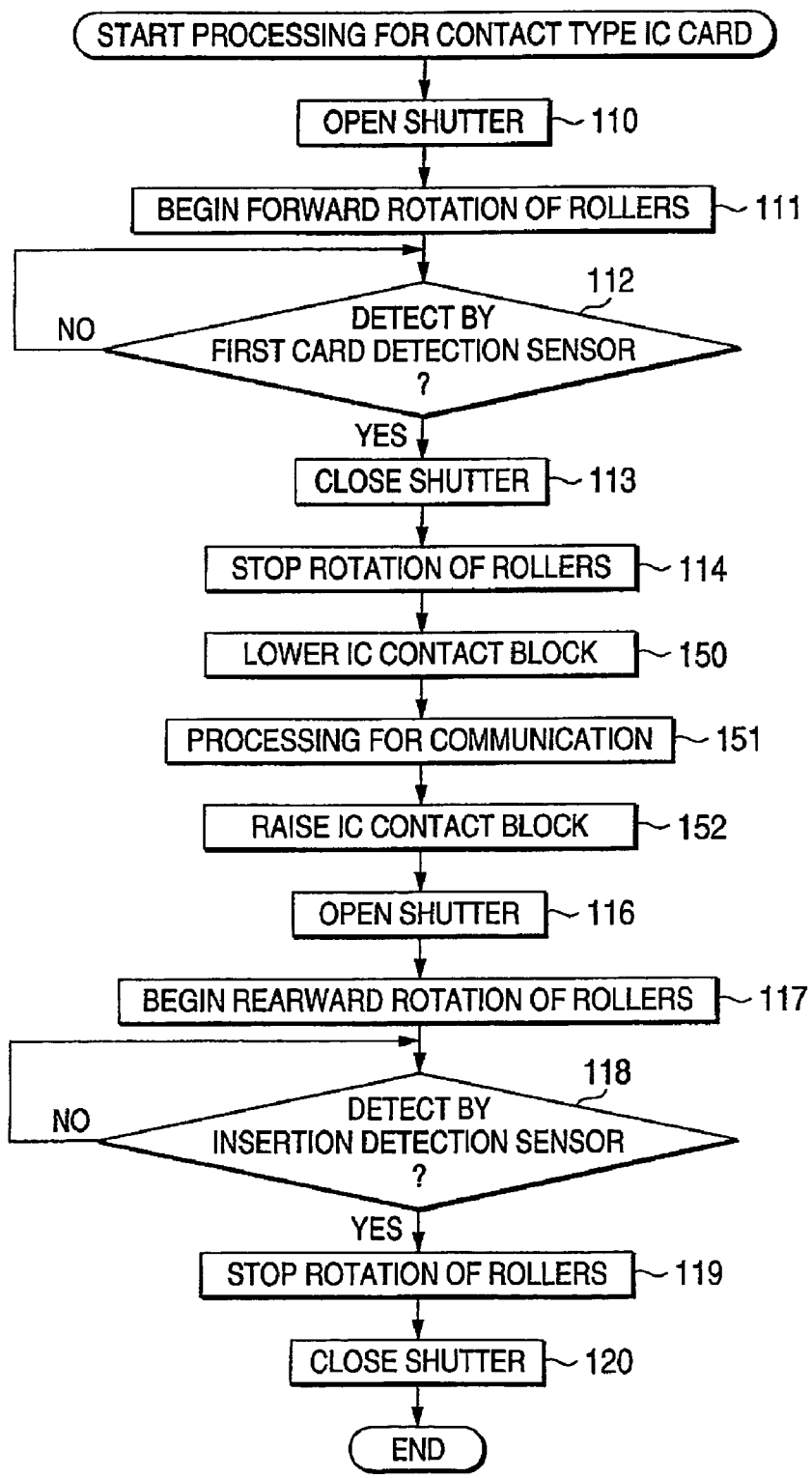
FIG. 8 is a flowchart illustrating exemplary processing for a contact type IC card.

With reference to FIG. 8, an explanation is given of the processing for a contact type IC card in STEP 107 (illustrated in FIG. 5). The processing in respective STEPs until a contact type IC card is conveyed to a position corresponding to the first card detection sensor 16 since the shutter 44 is opened is the same as that for a non-contact type IC card 19, it is omitted. Respective similar STEPs are denoted by the same numbers as those in FIG. 6.

When the contact type IC card is stopped, the second solenoid is energized in STEP 150. Thereby, the IC contact block 14 descends. Thereby, the IC contact block 14 and an IC contact of the contact type IC card are brought into contact with each other.

In STEP 151, communication is performed between the card processing unit 90 and the contact type IC card via the IC contact block 14. Thereby, the card processing unit 90 reads information from the contact type IC card. The card processing unit 90 transmits the read information to a high-order apparatus via the communication unit 18. The card processing unit 90 receives information from the high-order apparatus via the communication unit 18. On the basis of the received information, the card processing unit 90 writes information on the contact type IC card. When communication is terminated, the procedure returns to STEP 152.

Energization of the second solenoid 15 is stopped in STEP 152. Thereby, the IC contact block 14 is caused to ascend. Thereby, the IC contact block 14 separates from the IC contact of the contact type IC card.

In order to return that contact type IC card, for which the processing of reading and writing of information is terminated, the procedure proceeds to STEP 116. In STEP 116, the shutter 44 is opened. Since the respective STEPs subsequent to STEP 116 are the same as those in the processing for a non-contact type IC card 19, they are omitted. The respective STEPs are denoted by the same numbers as those of the STEPs shown in FIG. 6.

Figure 2:
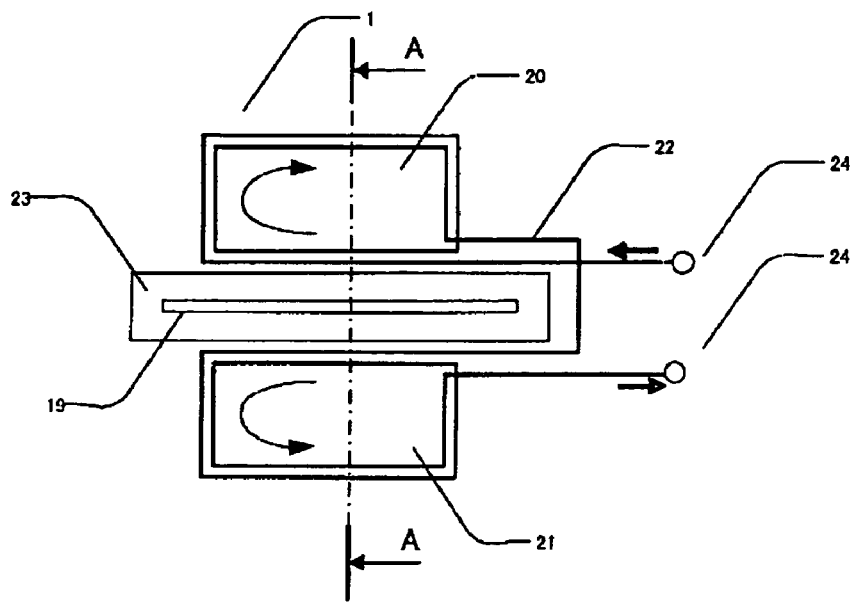
FIG. 2 is a front view showing an insertion-port loop antenna and an insertion port.
Figure 9:
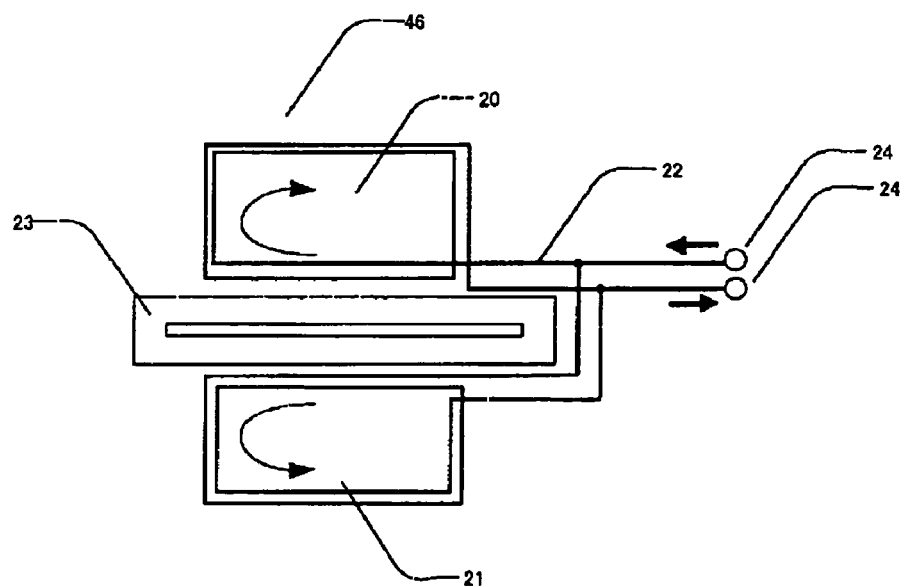
FIG. 9 is a front view showing a further exemplary embodiment of an insertion-port loop antenna.

FIG. 9 shows a further embodiment of the insertion-port loop antenna 1 illustrated in FIG. 2. The upper loop 20 and the lower loop 21 of the insertion-port loop antenna 1 shown in FIG. 2 are electrically connected in series to each other. Meanwhile, an upper loop 20 and a lower loop 21 of an insertion-port loop antenna 46 shown in FIG. 9 are electrically connected in parallel to each other. An electric current flowing through the upper loop 20 and the lower loop 21 is reversed in direction in the same manner as in FIG. 2. Thereby, the insertion-port loop antenna 46 shown in FIG. 9 attains the same function as that of the insertion-port loop antenna 1 shown in FIG. 2.

As shown in FIG. 4, the insertion-port loop antenna 1 generates an external magnetic flux 40 outside the card processing unit 90 and an internal magnetic flux 41 inside the card processing unit 90. A non-contact type IC card 19 is inserted into the insertion port 23. And, when a center of the non-contact type IC card 19 intersects a loop antenna surface of the insertion-port loop antenna 1, the external magnetic flux 40 and the internal magnetic flux 41, respectively, intersect the non-contact type IC card loop antenna 31 of the non-contact type IC card 19 from opposite directions. Therefore, the external magnetic flux 40 and the internal magnetic flux 41 cancel each other in the non-contact type IC card loop antenna 31. Therefore, the card processing unit 90 and the non-contact type IC card 19 cannot communicate with each other.

Also, even when the center of the non-contact type IC card 19 does not intersect the loop antenna surface of the insertion-port loop antenna 1, there is generated a state, in which the external magnetic flux 40 and the internal magnetic flux 41 intersect the non-contact type IC card loop antenna 31. At this time, the external magnetic flux 40 and the internal magnetic flux 41 attenuate each other in the non-contact type IC card loop antenna 31. Therefore, there can be an occasion when communication cannot be performed favorably.

Figure 10:
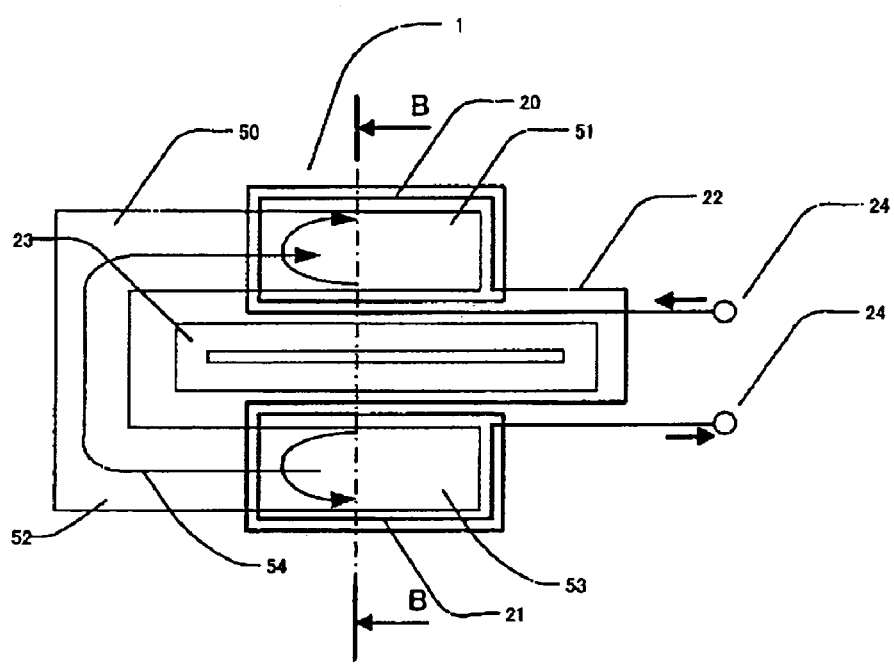
FIG. 10 is a front view showing an insertion-port loop antenna, at the back side of which is provided a ferromagnetic body.

Hereupon, in order to modify a path of the internal magnetic flux 41, a ferromagnetic body 50 is provided near a location where the internal magnetic flux 41 is generated. This is shown in FIG. 10. The ferromagnetic body 50 is provided at the back side of the insertion-port loop antenna 1. The ferromagnetic body 50 is U-shaped. An upper portion 51 of the ferromagnetic body 50 is provided on the upper loop 20. A lower portion 53 of the ferromagnetic body 50 is provided on the lower loop 21. A connection 52 of the ferromagnetic body 50 connects between the upper portion 51 of the ferromagnetic body and the lower portion 53 of the ferromagnetic body 50. The connection 52 of the ferromagnetic body 50 is provided in a position that does not overlap the insertion port 23.

When an electric current flows through the antenna terminals 24 in a direction indicated by the arrows illustrated, internal magnetic flux 54 flowing from the upper loop 20 to the lower loop 21 flows within the ferromagnetic body 50. The internal magnetic flux 54 is indicated by arrows in the ferromagnetic body 50.

Figure 11:
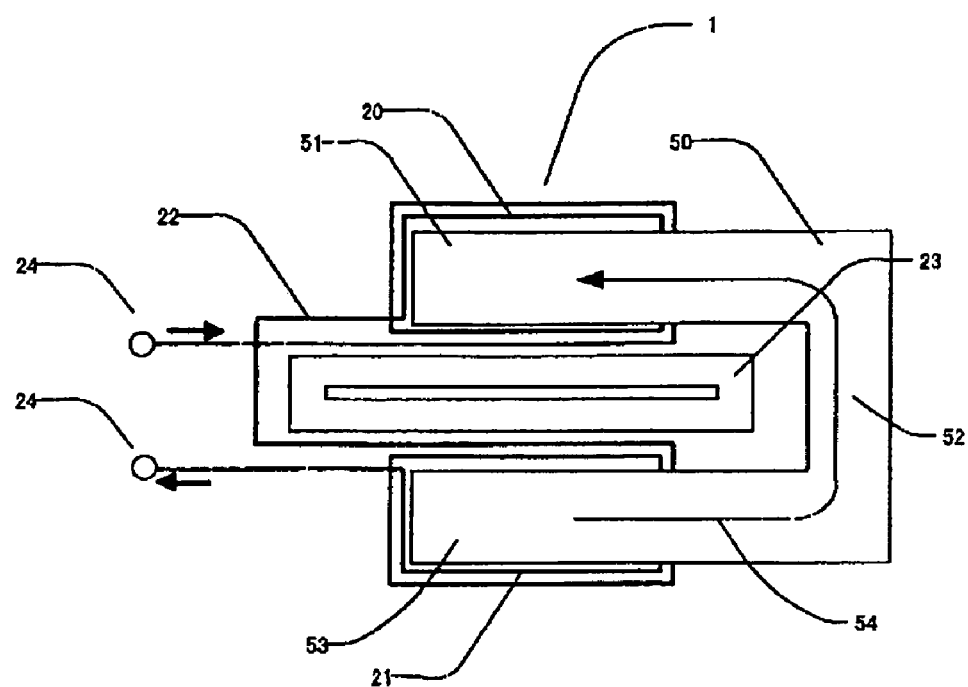
FIG. 11 is a rear view showing an insertion-port loop antenna, at the back side of which is provided a ferromagnetic body.

In FIG. 11, the insertion-port loop antenna 1 in FIG. 10 is viewed from a back side thereof. The ferromagnetic body 50 nearly overlaps a surface defined by the upper loop 20 and the lower loop 21. The ferromagnetic body 50 may overlap the upper loop 20 and the lower loop 21 wholly. It suffices that by the arrangement of the ferromagnetic body 50, most of the internal magnetic flux 41 generated from the insertion-port loop antenna 1 flow as the internal magnetic flux 54 in the ferromagnetic body 50.

Figure 12:
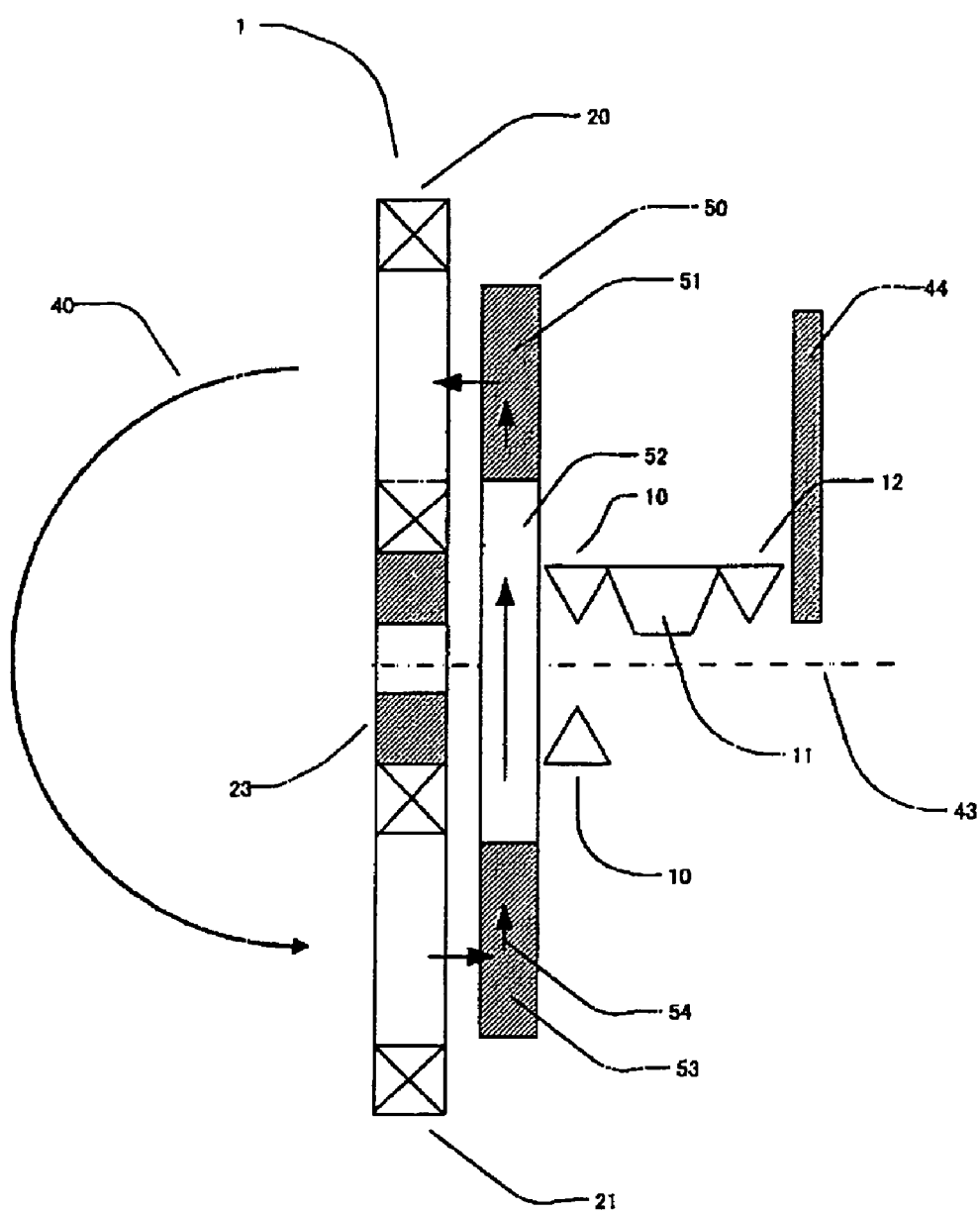
FIG. 12 shows a cross section as viewed from a side of an insertion-port loop antenna, at the back side of which is provided a ferromagnetic body.

FIG. 12 shows a partial, cross section of the card processing unit 90 taken along an alternate long and short dash line indicated by arrows B in FIG. 10. The ferromagnetic body 50 is provided at the back side of the insertion-port loop antenna 1. The internal magnetic flux 41 generated from the back side of the insertion-port loop antenna 1 flows within the ferromagnetic body 50. Magnetic flux, a path of which is changed, is indicated, as the internal magnetic flux 54, by arrows in the ferromagnetic body 50.

The external magnetic flux 40 generated from a front side of the insertion-port loop antenna 1 is the same as that shown in FIG. 4. Accordingly, the external magnetic flux 40 flows in front of the insertion port 23.

Thereby, that magnetic flux, which intersects the non-contact type IC card 19, is only the external magnetic flux 40. Accordingly, the external magnetic flux 40 and the internal magnetic flux 41 will not cancel each other on the non-contact type IC card 19. In accordance with a depth, by which the non-contact type IC card 19 is inserted into the insertion port 23, the external magnetic flux 40 and the internal magnetic flux 41 will not cancel each other.

Also, the insertion-port loop antenna 1 serves to detect that the non-contact type IC card 19 approaches the insertion port 23. Therefore, without the use of the internal magnetic flux 41, it is possible to detect that the non-contact type IC card 19 approaches the insertion port 23.

When an electric current flows through the loop coil, its electromagnetic induction generates an eddy current around the loop coil. Thereby, a Joule loss due to the eddy current is induced in a manner to prevent fluctuation in magnetic flux when the magnetic flux is varied in metal. This is called an eddy current loss.

Figure 13:
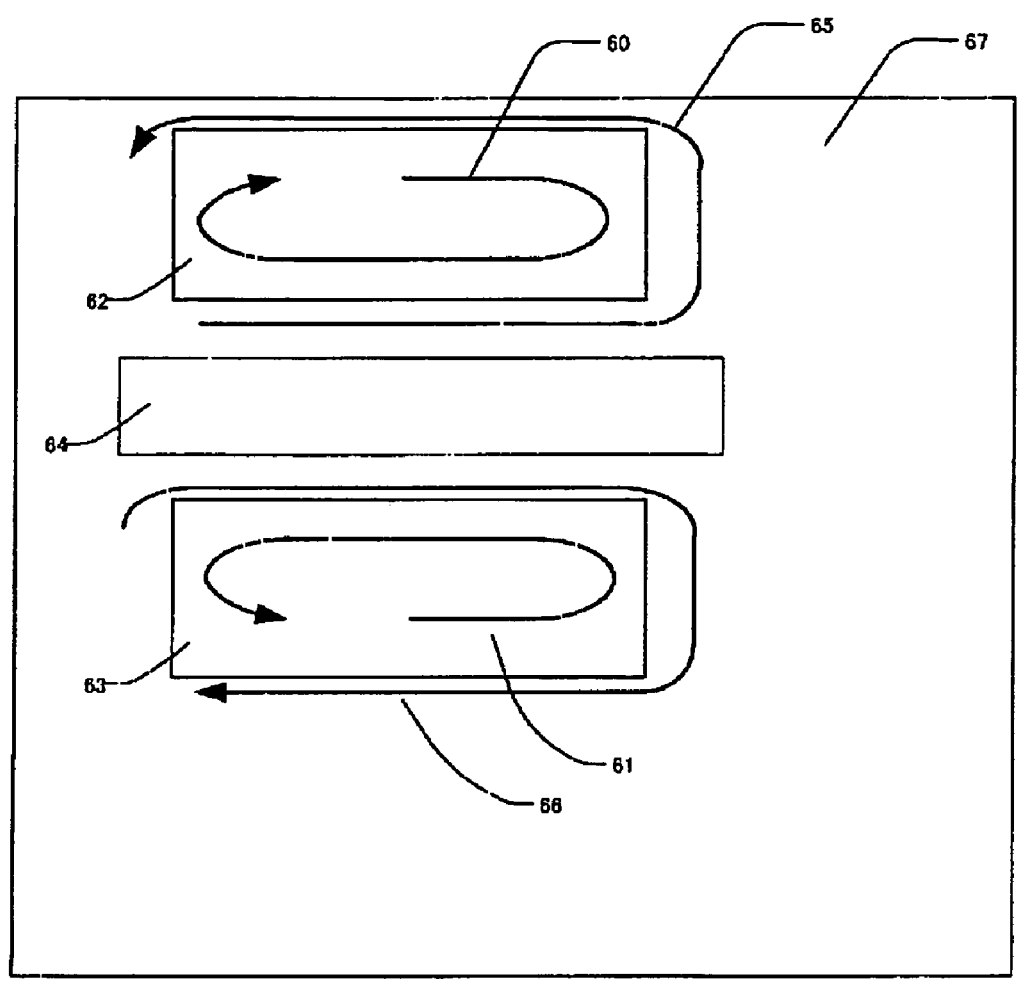
FIG. 13 is a view showing a state, in which an eddy current is generated on a front plate of the card processing unit.

Here, it is assumed that a front plate 67 (FIG. 13) of the card processing unit 90 is made of a metallic sheet. The use of a metallic sheet makes the card processing unit 90 firm. FIG. 13 shows the front plate formed with holes in positions, in which the upper loop 20, the lower loop 21, and the insertion port 23, respectively, are provided. The upper loop 20 is provided in an upper-loop hole 62. The lower loop 21 is provided in a lower-loop hole 63. The insertion port 23 is provided in an insertion-port hole 64. In FIG. 13, the illustration of the upper loop 20, the lower loop 21, and the insertion port 23 is omitted for clarity purposes.

An electric current is caused to flow through the insertion-port loop antenna 1. Then, an electric current flows through the upper loop 20 and the lower loop 21. An arrow 60 indicates a manner, in which an electric current flows through the upper loop 20. A sense of the arrow 60 indicates one, in which an electric current flows. An arrow 61 indicates a manner, in which an electric current flows through the lower loop 21. A sense of the arrow 61 indicates one, in which an electric current flows.

An electric current flows in the insertion-port loop antenna 1 whereby an eddy current flows in the front plate 67 therearound. An eddy current 65 in an opposite direction to the electric current indicated by the arrow 60 is generated around the upper-loop hole 62. An eddy current 66 in an opposite direction to the electric current indicated by the arrow 61 is generated around the lower-loop hole 63.

Since the eddy currents 65, 66 are generated in the upper loop 20 and the lower loop 21, respectively, the eddy current loss is increased.

Figure 14:
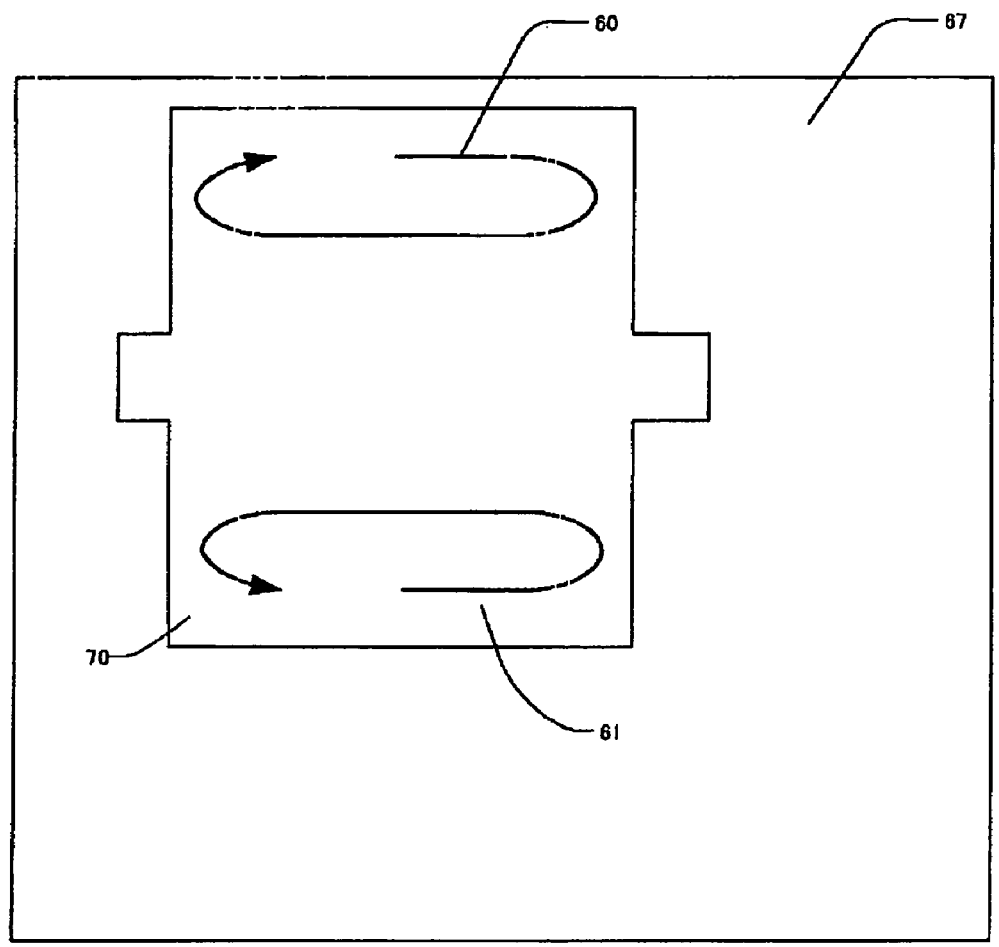
FIG. 14 is a view showing the front plate of the card processing unit.

It is desired that upon the upper-loop hole 62 and the lower-loop hole 63 be connected together to form one hole to cancel the eddy current and reduce the eddy current loss. FIG. 14 shows a shape of a hole 70 thus formed in the front plate 67. The upper-loop hole 62, the lower-loop hole 63, and the insertion-port hole 64 join together to form a single hole 70.

An eddy current is generated by an electric current that flows through the upper loop 20 and is indicated by an arrow 60. And, an eddy current is generated by an electric current that flows through the lower loop 21 and is indicated by an arrow 61. However, since these eddy currents are liable to be generated around the hole 70 and are opposite to each other in direction, they cancel each other. Thereby, the eddy current loss is reduced.

In order to reduce generation of the eddy current, the insertion port 23 is preferably made of a non-conducting material. Preferably, the insertion port 23 is made of a resin such as plastics, etc. Also, an outward appearance is made better by covering the front surface of the front plate 67 with plastics, etc. In addition, such covering can protect the insertion-port loop antenna.

Figure 15:
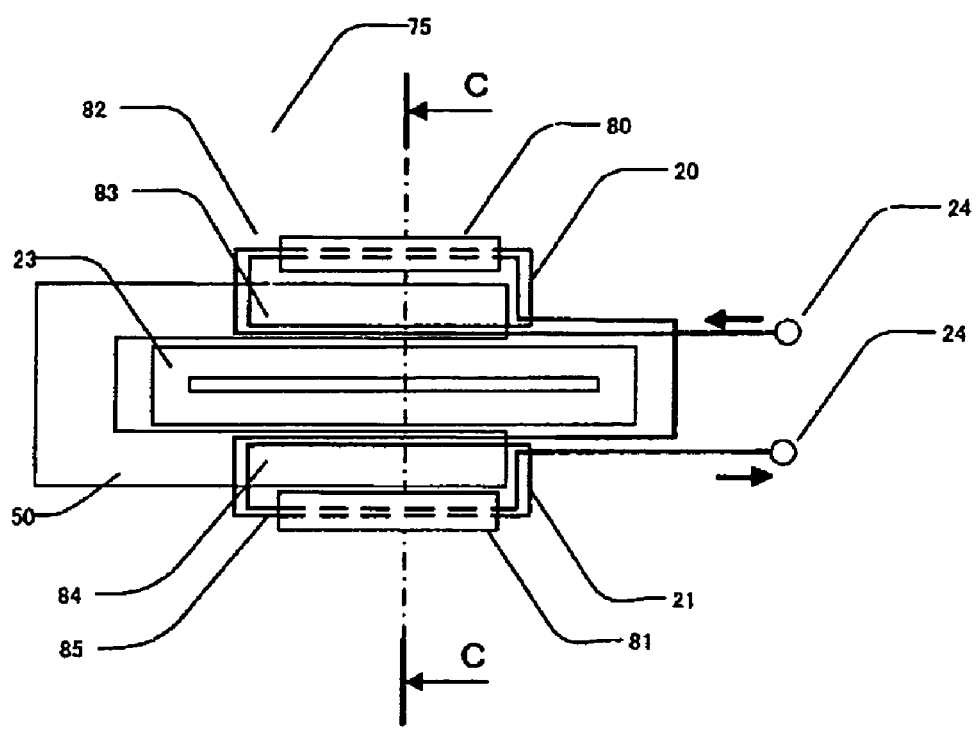
FIG. 15 is a front view showing an insertion-port loop antenna, in which a covering made of a ferromagnetic body is provided on a part of a loop.
Figure 16:
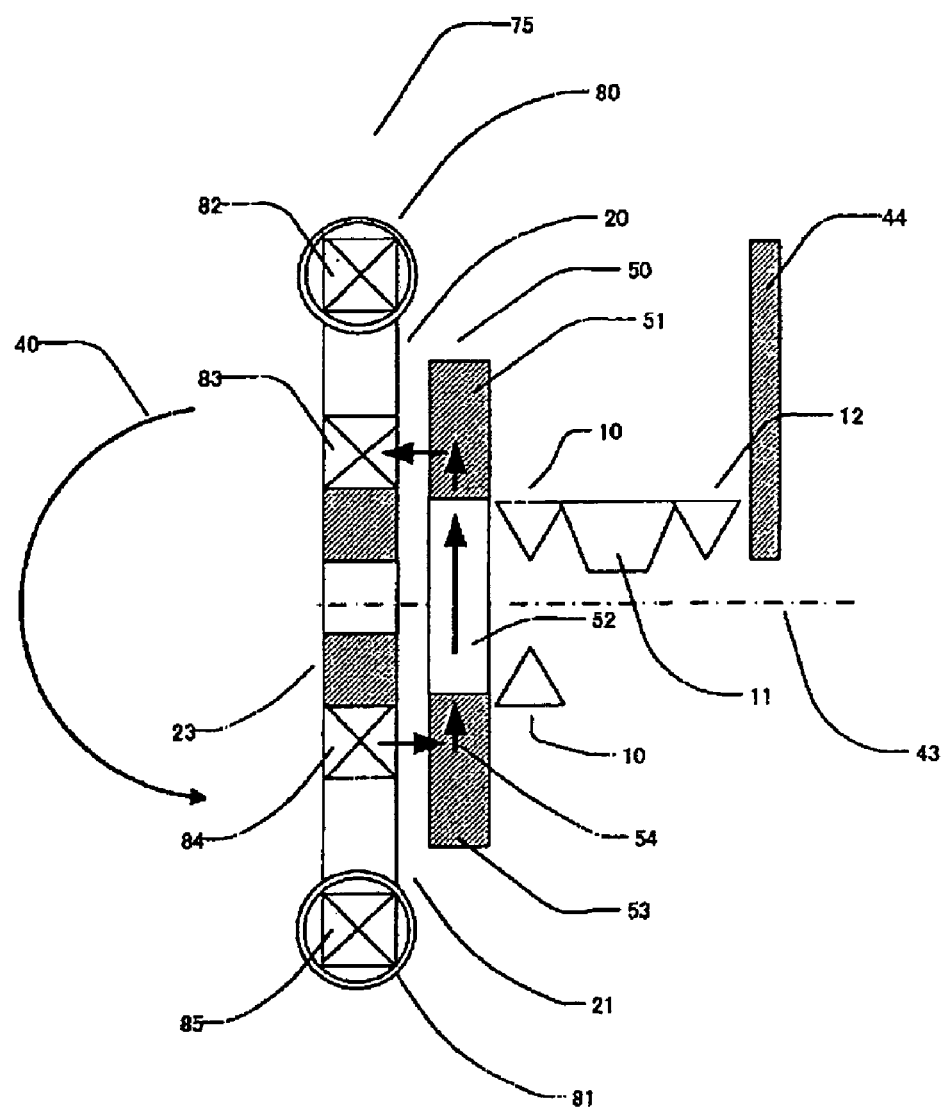
FIG. 16 shows a cross section as viewed from a side of an insertion-port loop antenna, in which a covering made of a ferromagnetic body is provided on a part of a loop.

Next, an explanation is given to an embodiment of the invention in which the loops of the insertion-port loop antenna 1 are reduced in area. FIG. 15 shows a insertion-port loop antenna 75. FIG. 16 shows a cross section taken along an alternate long and short dash line indicated by arrows C in FIG. 15. A ferromagnetic body 80 covers the surrounding of an upper loop bundle 82 of the upper loop 20. Since the ferromagnetic body 80 absorbs magnetic flux generated from the upper loop bundle 82 of the upper loop 20, a lower loop bundle 83 of the upper loop 20 is not affected by the magnetic flux generated from the upper loop bundle 82. Thereby, the upper loop bundle 82 and the lower loop bundle 83 of the upper loop 20 can be made close to each other. Accordingly, the loops can be reduced in area.

Similarly, the loops can be reduced in area by covering the lower loop 21 with a ferromagnetic body 81.

Since the loss is reduced by the provision of a ferromagnetic body, an equivalent communication can be performed with less power consumption.

In FIG. 15, the ferromagnetic body 80 covers the upper loop bundle 82 of the upper loop 20 and the ferromagnetic body 81 covers a lower loop bundle 85 of the lower loop 21. On the other hand, the ferromagnetic body 80 may cover the lower loop bundle 83 of the upper loop 20 and the ferromagnetic body 81 may cover an upper loop bundle 84 of the lower loop 21.

Further, it is assumed that coils in the upper loop 20 and the lower loop 21 are wound in the same direction. At this time, it suffices that the upper loop bundle 82 of the upper loop 20 be covered by the ferromagnetic body 80 and the upper loop bundle 84 of the lower loop 21 be covered by the ferromagnetic body 81. Also, it suffices that the lower loop bundle 83 of the upper loop 20 be covered by the ferromagnetic body 80 and the upper loop bundle 84 of the lower loop 21 be covered by the ferromagnetic body 81.

According to the embodiment of the invention, the shutter 44 is opened in the case where a card is detected by the insertion detection sensor 10, the insertion-port loop antenna 1, etc. With a card processing unit provided with no shutter at an insertion port, rollers serving for conveyance of a card may be rotated instead of opening a shutter.

Figure 17:
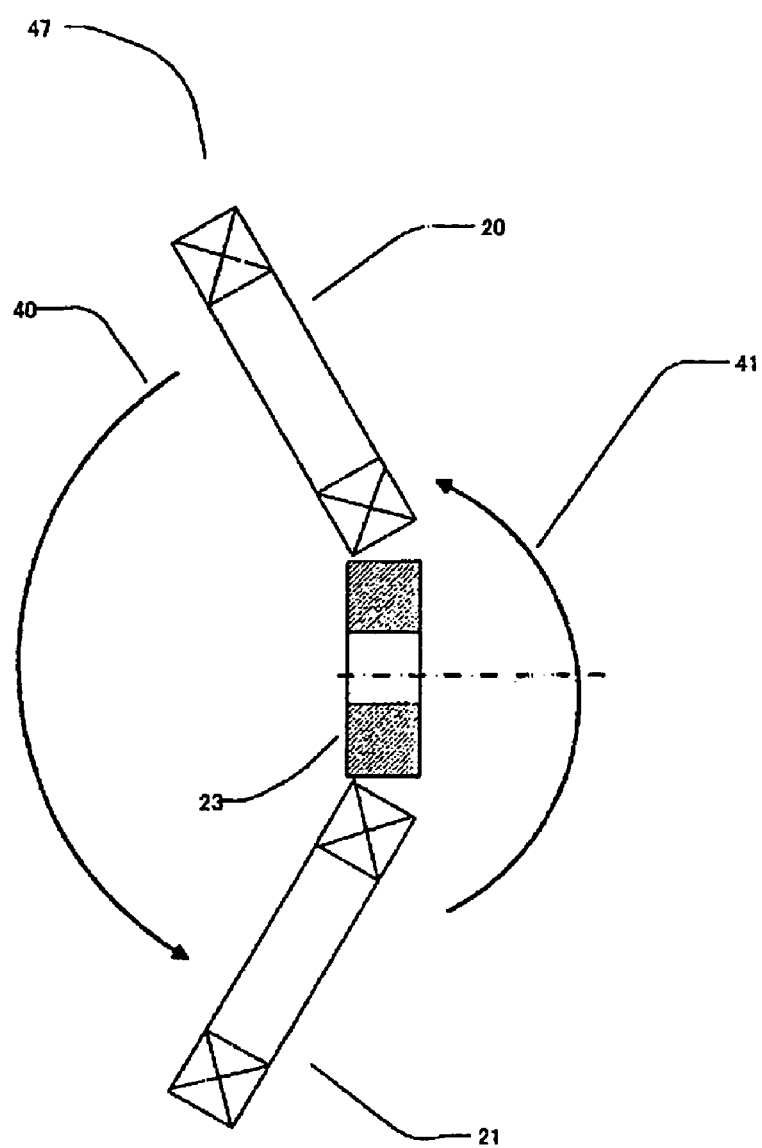
FIG. 17 is a cross sectional view showing an insertion-port loop antenna, in which an upper loop and a lower loop are changed in position.

Heretofore, there has been described an arrangement, in which the antenna surface of the insertion-port loop antenna perpendicularly intersects a direction of insertion of a non-contact type IC card. Subsequently, an insertion-port loop antenna 47 that does not intersect the direction of card insertion perpendicularly will be described with reference to FIG. 17.

An upper loop 20 is inclined at an acute angle relative to a conveyance direction at the insertion port 23. A lower loop 21 is inclined at an acute angle relative to an insertion direction at the insertion port 23. Magnetic flux 40 generated between the upper loop 20 and the lower loop 21 is formed in front of the insertion port 23. Thereby, the card processing unit 90 can communicate with a non-contact type IC card 19 in front of the insertion port 23. Therefore, the card processing unit 90 can detect presence and absence of the non-contact type IC card 19 in front of the insertion port 23.

What is claimed as new and desired to be protected by Letters Patent of the United States is:

1. An insertion-port loop antenna mounted in the vicinity of a rectangular-shaped insertion port, through which a non-contact type communication medium is inserted, said loop antenna comprising:

two loops, one of which is arranged above a long side of the insertion port and the other of which is arranged below the long side of the insertion port, said two loops being opposite to each other in a winding direction, wherein a plane defined by the respective loops is substantially perpendicular to a direction in which the non-contact type communication medium is inserted into the port.

2. An insertion-port loop antenna mounted in the vicinity of a rectangular-shaped insertion port, through which a non-contact type communication medium is inserted, said loop antenna comprising:

two loops, one of which is arranged above a long side of the insertion port and the other of which is arranged below the long side of the insertion port, said two loops being opposite to each other in a winding direction, and a single magnetic body provided in a position that is at a back of the port in a direction in which the non-contact type communication medium is inserted, and overlaps the two loops but does not overlap the insertion port.

3. A non-contact type communication medium insertion-port module comprising:

a rectangular-shaped insertion port, through which a non-contact type communication medium is inserted;

an insertion-port loop antenna mounted in the vicinity of the rectangular-shaped insertion port comprising two loops, one of which is arranged above a long side of the insertion port and the other of which is arranged below the long side of the insertion port, the two loops being opposite to each other in a winding direction; and a metallic plate formed with the insertion port and a single hole, in which the two loops of the insertion-port loop antenna are mounted.

4. A non-contact type communication medium processing unit comprising:

a rectangular-shaped insertion port, through which a non-contact type communication medium is inserted;

a conveyance mechanism that conveys a non-contact type communication medium inserted from the insertion port;

a shutter positioned between the insertion port and the conveyance mechanism, an antenna that communicates with the non-contact type communication medium conveyed by the conveyance mechanism;

an insertion-port loop antenna mounted in the vicinity of the rectangular-shaped insertion port comprising two loops, one of which is arranged above a long side of the insertion port and the other of which is arranged below the long side of the insertion port, the two loops being opposite to each other in a winding direction; and a shutter control unit that opens the shutter on the basis of the insertion-port loop antenna having been able to communicate with the non-contact type communication medium.

5. An insertion-port loop antenna mounted in the vicinity of a rectangular-shaped insertion port, through which a non-contact type communication medium is inserted, the loop antenna comprising:

two loops, one of which is arranged above a long side of the insertion port and the other of which is arranged below the long side of the insertion port, and wherein a ferromagnetic body covers a circumference of a first loop bundle of an upper loop in parallel to the long side of the insertion port and a ferromagnetic body covers a circumference of a second loop bundle of a lower loop in parallel to the long side of the insertion port.

* * * * *